United States Patent
Wang et al.

(10) Patent No.: US 12,470,848 B2
(45) Date of Patent: Nov. 11, 2025

(54) TRIPLE CONVERSION GAIN PIXEL

(71) Applicant: OMNIVISION TECHNOLOGIES, INC., Santa Clara, CA (US)

(72) Inventors: Rui Wang, San Jose, CA (US); Takayuki Goto, Foster City, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 137 days.

(21) Appl. No.: 18/353,680

(22) Filed: Jul. 17, 2023

(65) Prior Publication Data

US 2025/0030962 A1    Jan. 23, 2025

(51) Int. Cl.
 *H04N 25/77* (2023.01)
 *H04N 25/59* (2023.01)
 *H04N 25/78* (2023.01)

(52) U.S. Cl.
 CPC ............. *H04N 25/77* (2023.01); *H04N 25/59* (2023.01); *H04N 25/78* (2023.01)

(58) Field of Classification Search
 CPC ........ H04N 25/77; H04N 25/59; H04N 25/78; H04N 25/46; H04N 25/778
 See application file for complete search history.

(56) References Cited

U.S. PATENT DOCUMENTS

| | | | |
|---|---|---|---|
| 2021/0136303 A1* | 5/2021 | Kim | H10F 39/813 |
| 2022/0337777 A1* | 10/2022 | Shim | H04N 25/771 |
| 2023/0144373 A1* | 5/2023 | Kim | H10F 39/8053 |
| | | | 348/302 |
| 2024/0243142 A1* | 7/2024 | Moon | H10F 39/8037 |
| 2024/0243151 A1* | 7/2024 | Kim | H10F 39/813 |
| 2024/0284061 A1* | 8/2024 | Lim | H04N 25/766 |

* cited by examiner

*Primary Examiner* — Nhan T Tran
(74) *Attorney, Agent, or Firm* — Dorsey & Whitney LLP

(57) ABSTRACT

A pixel array includes a plurality of pixel cells, each including a photodiode configured to photogenerate image charge in response to the incident light, a first floating diffusion (FD) coupled to receive the image charge from the photodiode, a reset transistor coupled between a voltage source and the first FD, a second FD coupled between the first FD and ground, a first dual FD transistor coupled between the first and second FDs. Second FDs of first and second pixel cells are coupled. Second FDs of third and fourth pixel cells are coupled.

20 Claims, 8 Drawing Sheets ns may be exag-

TRIPLE CONVERSION GAIN PIXEL

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
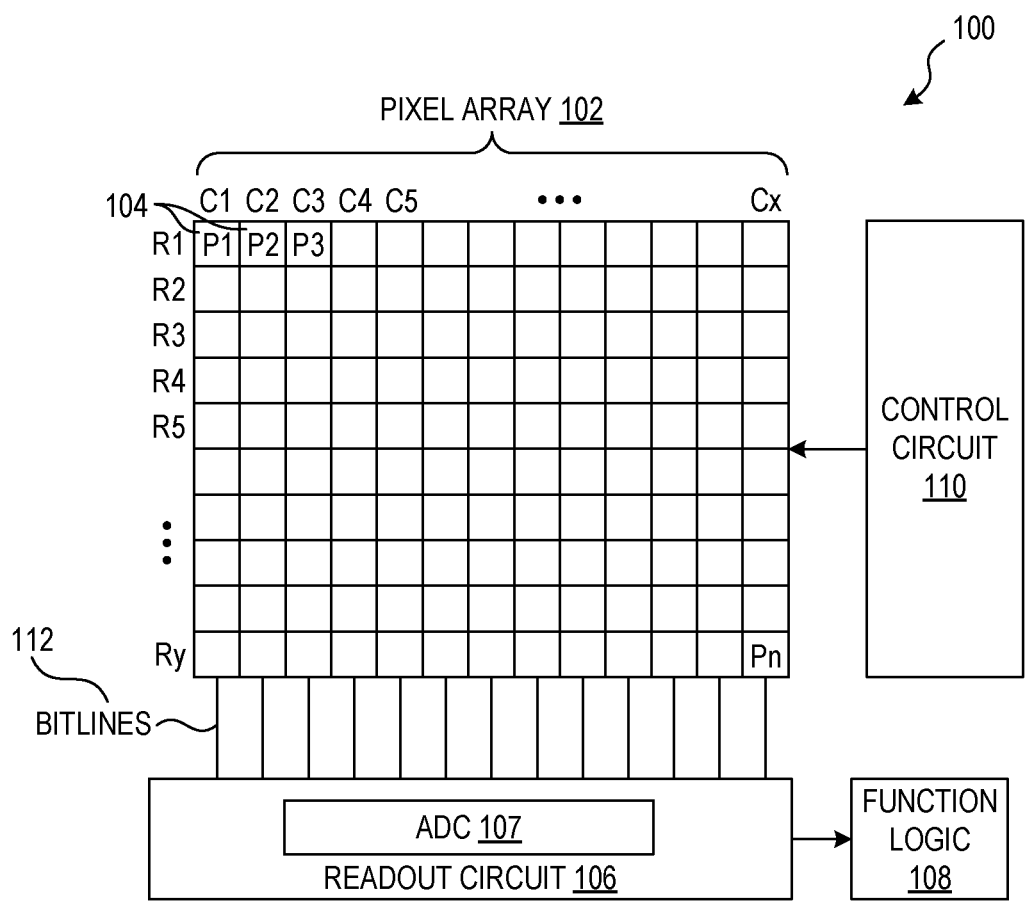
FIG. 1 illustrates one example of an imaging system in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with pixel cells providing triple conversion gain are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with pixel cells providing triple conversion gain (TCG) are disclosed. In conventional imaging systems, dual conversion gain (DCG) is used to improve the signal-to-noise ratio (SNR) and the dynamic range (DR). For example, high conversion gain (HCG) is used in low light regions to keep the readout noise low, and low conversion gain (LCG) is used in bright light regions to make full use of the pixel cells' full well capacity (FWC). However, a third conversion gain mode, namely medium conversion gain (MCG), may be necessary when supporting, for example, 50 megapixel images using 4-cell pixel units and/or 12.5 megapixel images using 16-cell pixel units with sufficiently high SNR and DR.

In some imaging systems providing TCG, a first dual floating diffusion transistor, a second dual floating diffusion transistor, and a reset transistor are coupled in series in a vertical direction. Consequently, although second floating diffusions of vertically adjacent pixel cells can be coupled, the small pixel cell layout area makes coupling third floating diffusions of vertically adjacent pixel cells difficult. Some of the capacitors corresponding to the floating diffusions may also need to include vertically oriented metal plates. Moreover, horizontally adjacent pixel cells do not have their floating diffusions coupled, making horizontal binning difficult. The target conversion gains ratios between HCG, MCG, and LCG can also be difficult to achieve.

It is appreciated that pixel cells providing TCG in accordance with the teachings of the present disclosure each include first and second dual floating diffusion transistors coupled in parallel. Moreover, second floating diffusions of vertically adjacent pixel cells are coupled, and third floating diffusions of horizontally adjacent cells are coupled, allowing horizontal binning during, for example, LCG readouts. The target conversion gains ratios between HCG, MCG, and LCG can also be more easily achieved.

Thus, as will be shown and described in the various examples below, an example pixel array includes a plurality of pixel cells arranged in rows and columns, wherein each of the pixel cells is configured to generate a respective image signal in response to incident light, wherein each of the pixel cells includes a photodiode configured to photogenerate image charge in response to the incident light, a first floating diffusion (FD) coupled to receive the image charge from the photodiode, a reset transistor coupled between a voltage source and the first FD, a second FD coupled between the first FD and the reset transistor, a first dual floating diffusion transistor coupled between the first and second FDs, a third FD coupled between the second FD and ground, and a second dual floating diffusion transistor coupled between the second and third FDs. A second FD of a first one of the pixel cells is coupled to a second FD of a second one of the pixel cells. A second FD of a third one of the pixel cells is coupled to a second FD of a fourth one of the pixel cells. A third FD of the first one of the pixel cells is coupled to a third FD of the third one of the pixel cells. A third FD of the second one of the pixel cells is coupled to a third FD of the fourth one of the pixel cells.

To illustrate, FIG. 1 shows one example of an imaging system 100 having a readout circuit 106 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, the readout circuit 106 may be configured to read out the image signals through the column bitlines 112. As will be discussed, in the various examples, readout circuit 106 may include an analog-to-digital converter (ADC) 107 in accordance with the teachings of the present disclosure. In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2A:
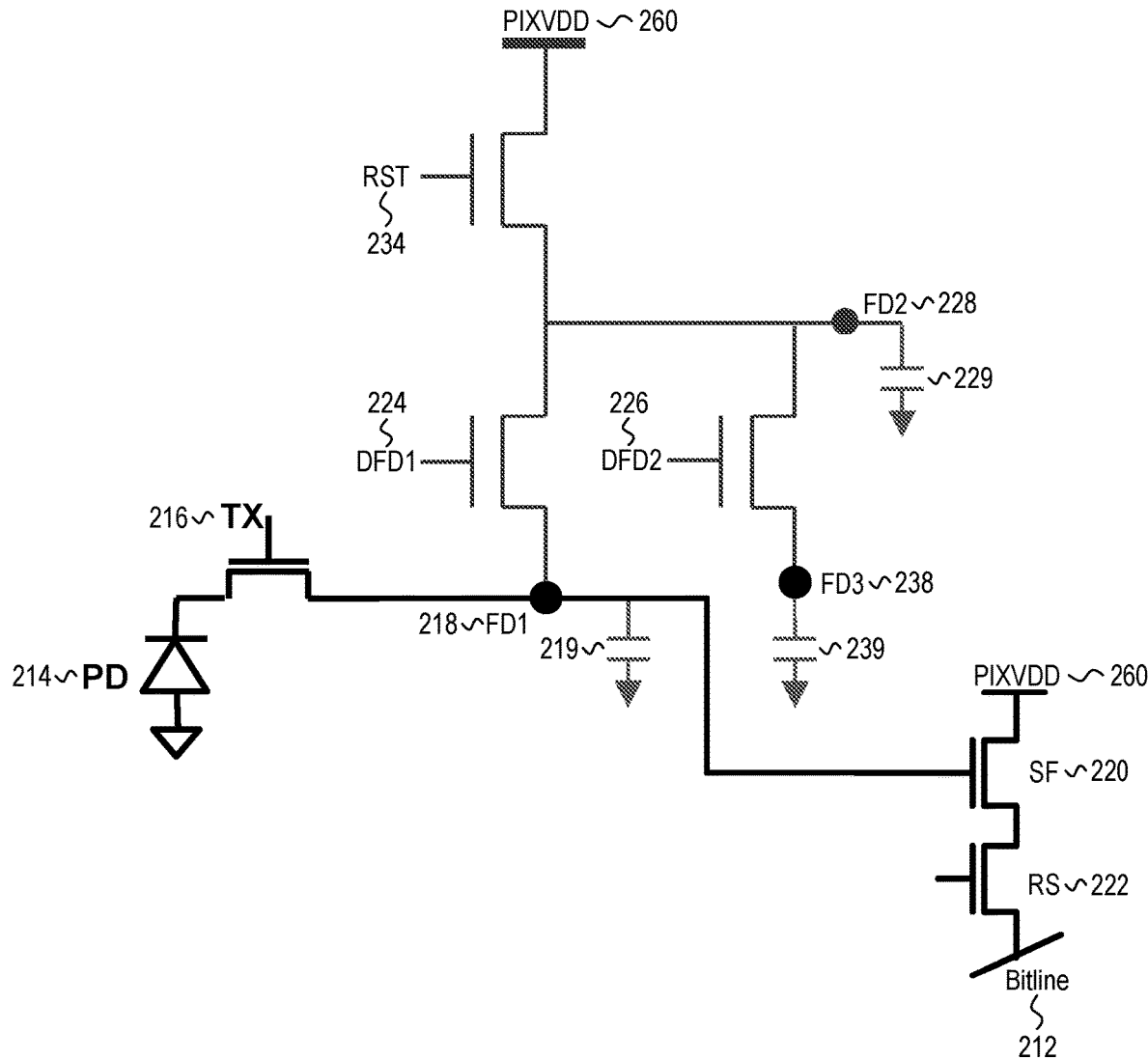
FIGS. 2A and 2B illustrate schematics of example pixel cells in accordance with the teachings of the present disclosure.
Figure 2B:
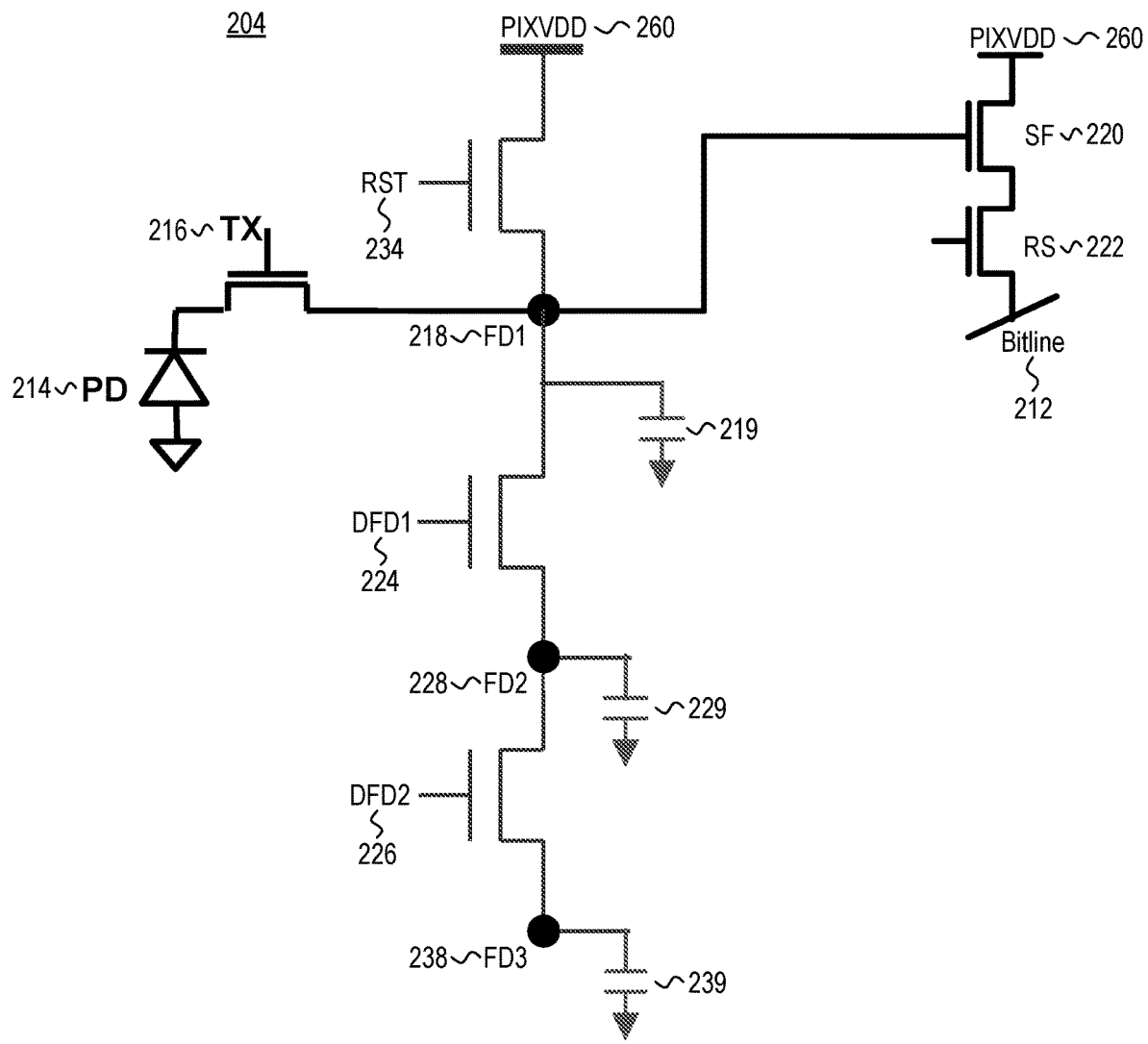

FIGS. 2A and 2B illustrate schematics of example pixel cells (i.e., pixel circuits) 204 in accordance with the teachings of the present disclosure. It is appreciated that the pixel cells 204 of FIGS. 2A and 2B may be examples of one of the pixel circuits 104 included in the imaging system 100 as shown in FIG. 1, and that similarly named and numbered elements described above are coupled and function similarly below.

Referring to FIG. 2A, the pixel cell 204 includes a photodiode 214 configured to photogenerate image charge in response to the incident light, a first floating diffusion FD1 218 coupled to receive the image charge from the photodiode 214, a reset transistor RST 234 coupled between a voltage source PIXVDD 260 and FD1 218, a second floating diffusion FD2 228 coupled between FD1 218 and the reset transistor 234, a first dual floating diffusion transistor DFD1 224 coupled between FD1 218 and FD2 228, a third floating diffusion FD3 238 coupled between FD2 228 and ground, and a second dual floating diffusion transistor DFD2 226 coupled between FD2 228 and FD3 238. A first capacitor 219 is coupled between FD1 218 and ground, a second capacitor 229 is coupled between FD2 228 and ground, and a third capacitor 239 is coupled between FD3 238 and ground. The first, second, and third capacitors 219, 229, 239 are configured to store image charge at FD1 218, FD2 228, and FD3 238, respectively.

FD1 218 is coupled to a gate terminal of a source follower transistor SF 220. The source follower transistor 220 is coupled between the voltage source PIXVDD 260 and a bitline 212, and is configured to convert the charge from FD1 218 to a corresponding voltage signal. A row select transistor RS 222 is coupled between the source follower transistor 220 and the bitline 212, and is configured to send the voltage signal from the source follower transistor 220 to the bitline 212 in response to a row select control signal.

Referring to FIG. 2B, the pixel cell 204 includes a photodiode 214 configured to photogenerate image charge in response to the incident light, a first floating diffusion FD1 218 coupled to receive the image charge from the photodiode 214, a reset transistor RST 234 coupled between a voltage source PIXVDD 260 and FD1 218, a second floating diffusion FD2 228 coupled between FD1 218 and ground, a first dual floating diffusion transistor DFD1 224 coupled between FD1 218 and FD2 228, a third floating diffusion FD3 238 coupled between FD2 228 and ground, and a second dual floating diffusion transistor DFD2 226 coupled between FD2 228 and FD3 238. A first capacitor 219 is coupled between FD1 218 and ground, a second capacitor 229 is coupled between FD2 228 and ground, and a third capacitor 239 is coupled between FD3 238 and ground. The first, second, and third capacitors 219, 229, 239 are configured to store image charge at FD1 218, FD2 228, and FD3 238, respectively. In some embodiments, the pixel cell 204 may not include FD3 238 or the third capacitor 239, as will be described in further detail with respect to FIG. 3C below.

In contrast to the example pixel cell 204 illustrated in FIG. 2A, the example pixel cell 204 illustrated in FIG. 2B includes FD1 218 coupled between the reset transistor RST 234 and the first dual floating diffusion transistor DFD1 224. However, in both FIGS. 2A and 2B, FD1 218, FD2 228, and FD3 238 are coupled in series, while the first dual floating diffusion transistor DFD1 224 and the second dual floating diffusion transistor DFD2 226 are coupled in parallel between FD2 228 and ground.

It is also appreciated that in both FIGS. 2A and 2B, the first, second, and third capacitors 219, 229, 239 can have varying capacitance ratios. For example, the second capacitor 229 can have the same capacitance as the first capacitor 219 and the third capacitor 239 can have twice the capacitance as the first capacitor 219. In another example, the second capacitor 229 can have 1.5 times the capacitance as the first capacitor 219 and the third capacitor 239 can also have 1.5 times the capacitance as the first capacitor 219. It is further appreciated that each of the first, second, and third capacitors 219, 229, 239 can be a horizontal or vertical metal-insulator-metal capacitor. Horizontal is defined such that the metal plates of the capacitors extend generally parallel to rows of the pixel array (e.g., rows R1 to Ry of the pixel array 102 illustrated in FIG. 1). Vertical is defined such that the metal plates of the capacitors extend generally parallel to columns of the pixel array (e.g., columns C1 to Cx of the pixel array 102 illustrated in FIG. 1).

FIGS. 3A, 3B, 3C, and 3D illustrate schematics of multiple example pixel cells 304*a*, 304*b*, 304*c*, 304*d* (only pixel cells 304*a* and 304*b* in FIG. 3D) in accordance with the teachings of the present disclosure. Certain circuit components of each pixel cell (e.g., photodiode, transfer transistor, source follower transistor, row select transistor) are omitted from the illustrated schematic so as to not obscure the novel features of the present disclosure. It is appreciated that each of the pixel cells 304*a*, 304*b*, 304*c*, 304*d* of FIGS. 3A, 3B, 3C, and 3D may be an example of one of the pixel circuits 104 included in the imaging system 100 as shown in FIG. 1, and that similarly named and numbered elements described above are coupled and function similarly below.

Figure 3A:
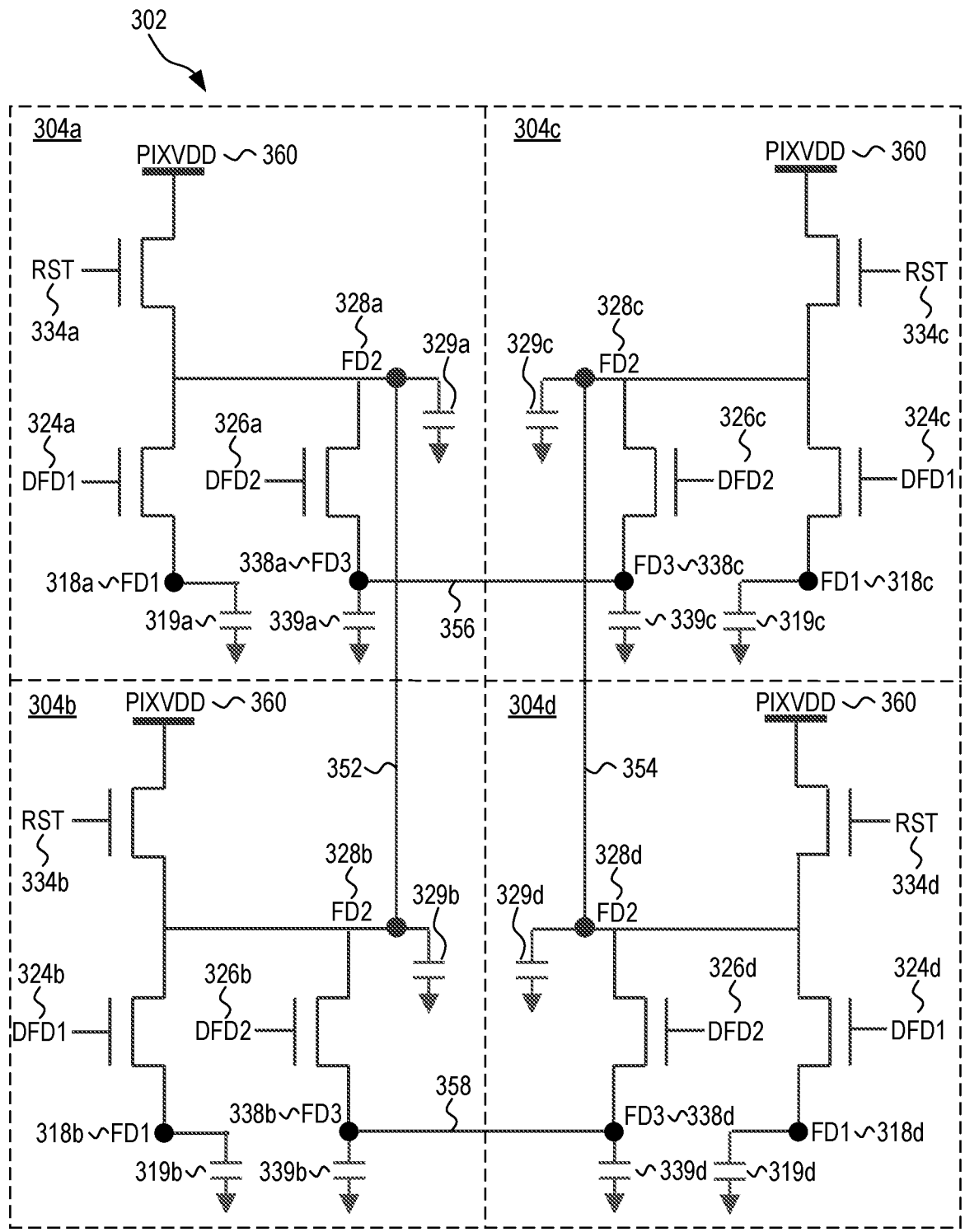
FIGS. 3A, 3B, 3C, and 3D illustrate schematics of multiple example pixel cells in accordance with the teachings of the present disclosure.

Referring to FIG. 3A, each of the pixel cells 304*a-d* may be an example of the pixel cell 204 illustrated in FIG. 2A. In the illustrated example, a first pixel cell 304*a* is arranged vertically adjacent to a second pixel cell 304*b* and horizontally adjacent to a third pixel cell 304*c*. Vertically adjacent is defined such that the first and second pixel cells 304*a*, 304*b* are in neighboring (e.g., adjacent) rows (e.g., rows R1 and R2 of the pixel array 102). Horizontally adjacent is defined such that the first and third pixel cells 304*a*, 304*c* are in neighboring (e.g., adjacent) columns (e.g., columns C1 and C2 of the pixel array 102). Continuing with the illustrated example, the second pixel cell 304*b* is arranged horizontally adjacent to a fourth pixel cell 304*d*. The third pixel cell 304*c* is arranged vertically adjacent to the fourth pixel cell 304*d*.

Each pixel cell 304 includes (labeled with a, b, c, or d) a first floating diffusion FD1 318, a first capacitor 319, a second floating diffusion FD2 328, a second capacitor 329, a third floating diffusion FD3 338, a third capacitor 339, a first dual floating diffusion transistor DFD1 324, a second dual floating diffusion transistor DFD2 326, and a reset transistor RST 334 coupled to a voltage source PIXVDD 360, which can be a global voltage source coupled to all pixel cells in a pixel array.

Circuits elements of the first pixel cell 304*a* and circuit elements of the second pixel cell 304*b* can be arranged in an identical or generally similar manner, as shown. Similarly, circuits elements of the third pixel cell 304*c* and circuit elements of the fourth pixel cell 304*d* can be arranged in an identical or generally similar manner, as shown. On the other hand, circuit elements of the first pixel cell 304*a* and circuit elements of the third pixel cell 304*c* can be arranged in a generally mirrored (i.e., symmetrical) fashion, as shown. Similarly, circuit elements of the second pixel cell 304*b* and circuit elements of the fourth pixel cell 304*d* can also be arranged in a generally mirrored (i.e., symmetrical) fashion, as shown. These arrangements provide the advantage of enabling easier connections between individual pixel cells, as will be described in further detail below.

FD2 328*a* of the first pixel cell 304*a* can be vertically coupled (e.g., across adjacent rows) to FD2 328*b* of the second pixel cell 304*b* via a first vertical connection 352. Similarly, FD2 328*c* of the third pixel cell 304*c* can be vertically coupled (e.g., across adjacent rows) to FD2 328*d* of the fourth pixel cell 304*d* via a second vertical connection 354.

FD3 338*a* of the first pixel cell 304*a* can be horizontally coupled (e.g., across adjacent columns) to FD3 338*c* of the third pixel cell 304*c* via a first horizontal connection 356. Similarly, FD3 328*b* of the second pixel cell 304*b* can be horizontally coupled (e.g., across adjacent columns) to FD3 338*d* of the fourth pixel cell 304*d* via a second horizontal connection 358.

The pixel cell arrangement described above provides several advantages. A group of four pixel cells 304 includes a total of eight floating diffusions: four FD1s 318, two vertically shared FD2s 328, and two horizontally shared FD3s 338. This layout is more feasible than other layouts incorporating three floating diffusions per pixel cell. This layout also enables horizontal binning, as the FD3s 338 are coupled horizontally. Moreover, the first, second, and third capacitors 319, 329, 339 can be formed using horizontally oriented metal plates, reducing the number of cross couplings for the first capacitor 319 without changing existing control lines.

In some embodiments, the second floating diffusion FD2 328 of each pixel cell can be coupled to the second floating diffusion FD2 328 of a horizontally adjacent pixel cell via a horizontal connection. In some embodiments, the third floating diffusion FD3 338 of each pixel cell can be coupled to the third floating diffusion FD3 338 of a vertically adjacent pixel cell via a vertical connection.

Figure 3B:
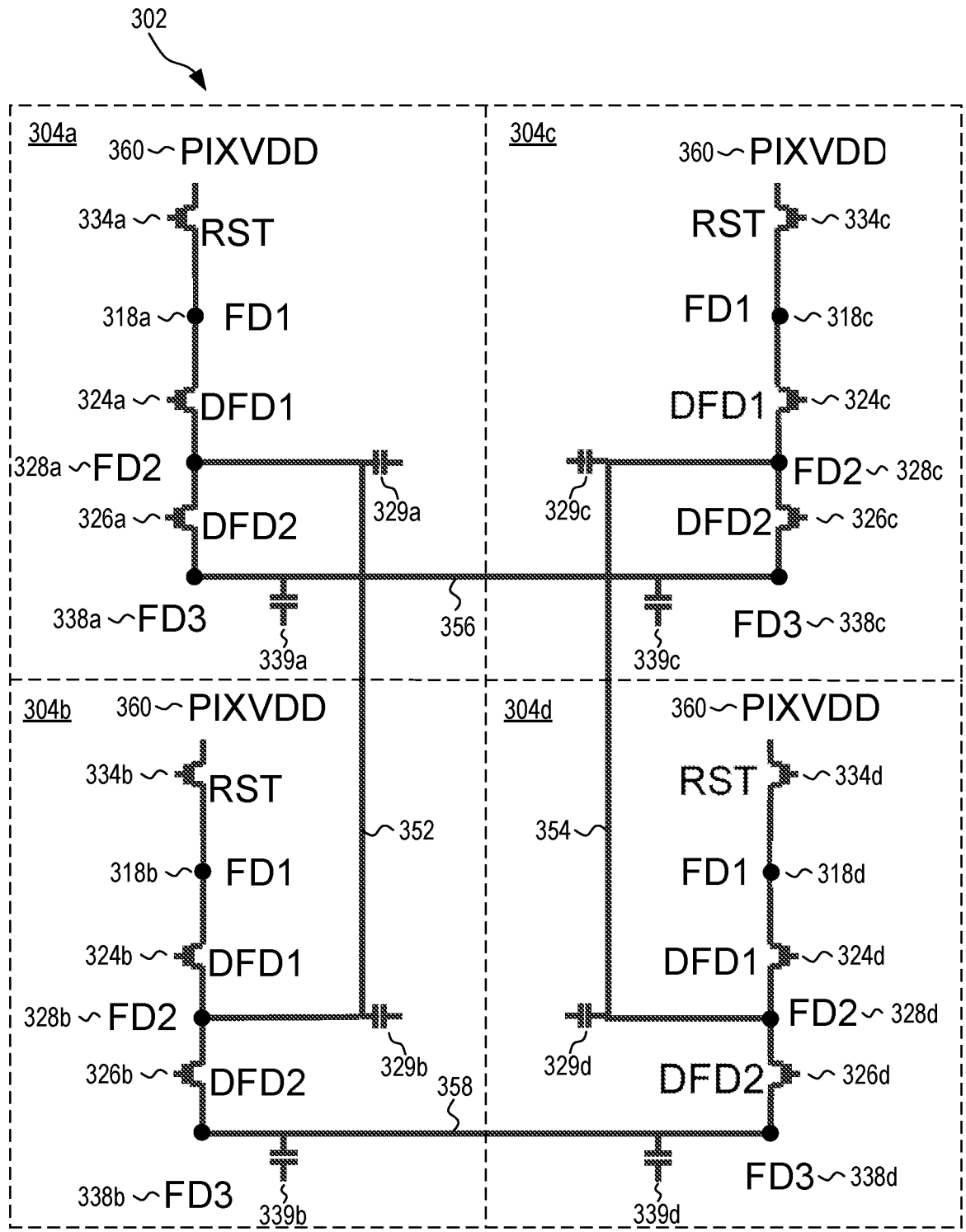

Referring to FIG. 3B, each of the pixel cells 304*a-d* may be an example of the pixel cell 204 illustrated in FIG. 2B. In the illustrated example, FD2 328*a* of the first pixel cell 304*a* is vertically coupled (e.g., across adjacent rows) to FD2 328*b* of the second pixel cell 304*b* via the first vertical connection 352. Similarly, FD2 328*c* of the third pixel cell 304*c* is vertically coupled (e.g., across adjacent rows) to FD2 328d of the fourth pixel cell 304d via the second vertical connection 354. FD3 338a of the first pixel cell 304a is horizontally coupled (e.g., across adjacent columns) to FD3 338c of the third pixel cell 304c via the first horizontal connection 356. Similarly, FD3 328b of the second pixel cell 304b is horizontally coupled (e.g., across adjacent columns) to FD3 338d of the fourth pixel cell 304d via the second horizontal connection 358.

Figure 3C:
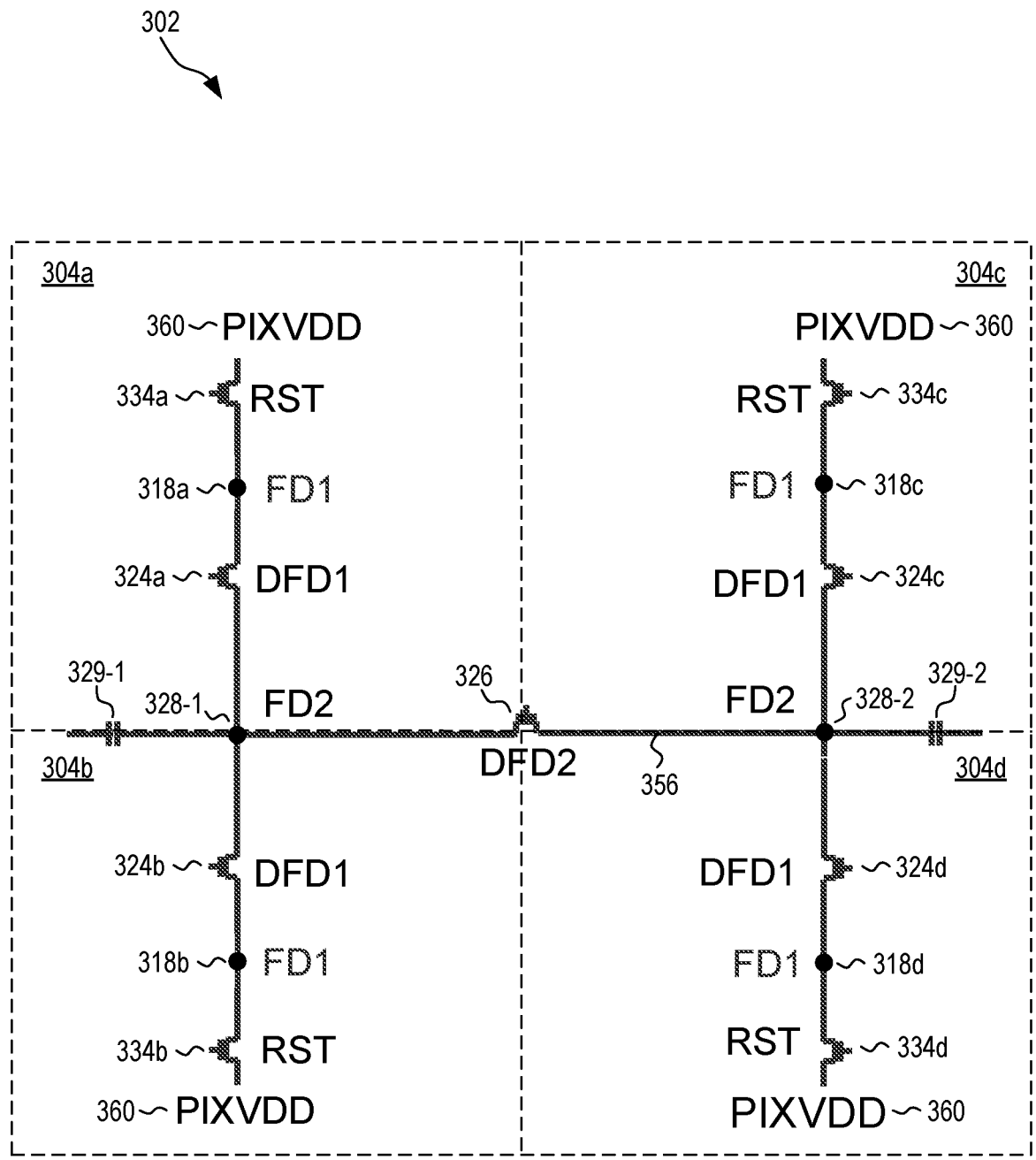

Referring to FIG. 3C, the second floating diffusions FD2 of the first pixel cell 304a and the second pixel cell 304b can be coupled together or "merged" to form a first shared second floating diffusion FD2 328-1. A first shared second capacitor 329-1 can be coupled to FD2 328-1. Similarly, the second floating diffusions FD2 of the third pixel cell 304c and the fourth pixel cell 304d can be coupled together or "merged" to form a second shared second floating diffusion FD2 328-2. A second shared second capacitor 329-2 can be coupled to FD2 328-2. Moreover, the third floating diffusion of each pixel may not be included or "merged" with the second floating diffusion FD2 of the neighboring pixels. For example, FD2 328-2 may serve as the third floating diffusion of the first and second pixel cells 304a, 304b, while FD2 328-1 may serve as the third floating diffusion of the third and fourth pixel cells 304c, 304d. A shared second floating diffusion transistor DFD2 326 can be coupled between the first and second shared second floating diffusions FD2 328-1, 328-2 via the horizontal connection 356.

Figure 3D:
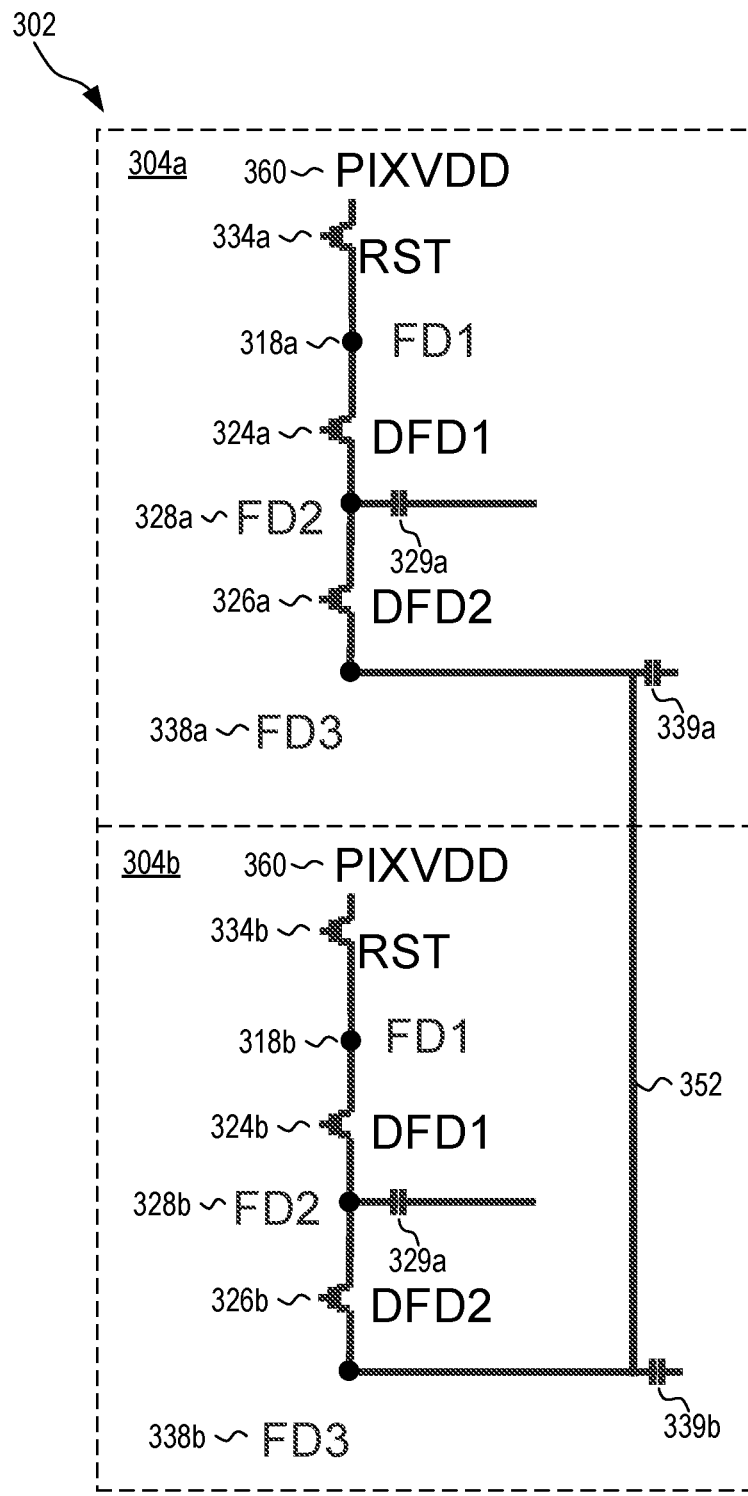

Referring to FIG. 3D, the third floating diffusions FD3 338a, 338b of the first and second pixel cells 304a, 304b can be coupled together or "merged" via the vertical connection 352. In the illustrated example, the first and second pixel cells 304a, 304b are not coupled to other pixel cells (e.g., via horizontal connections) such that each group of pixel cells includes two pixel cells, in contrast to the embodiments illustrated in FIGS. 3A-C.

Figure 4:
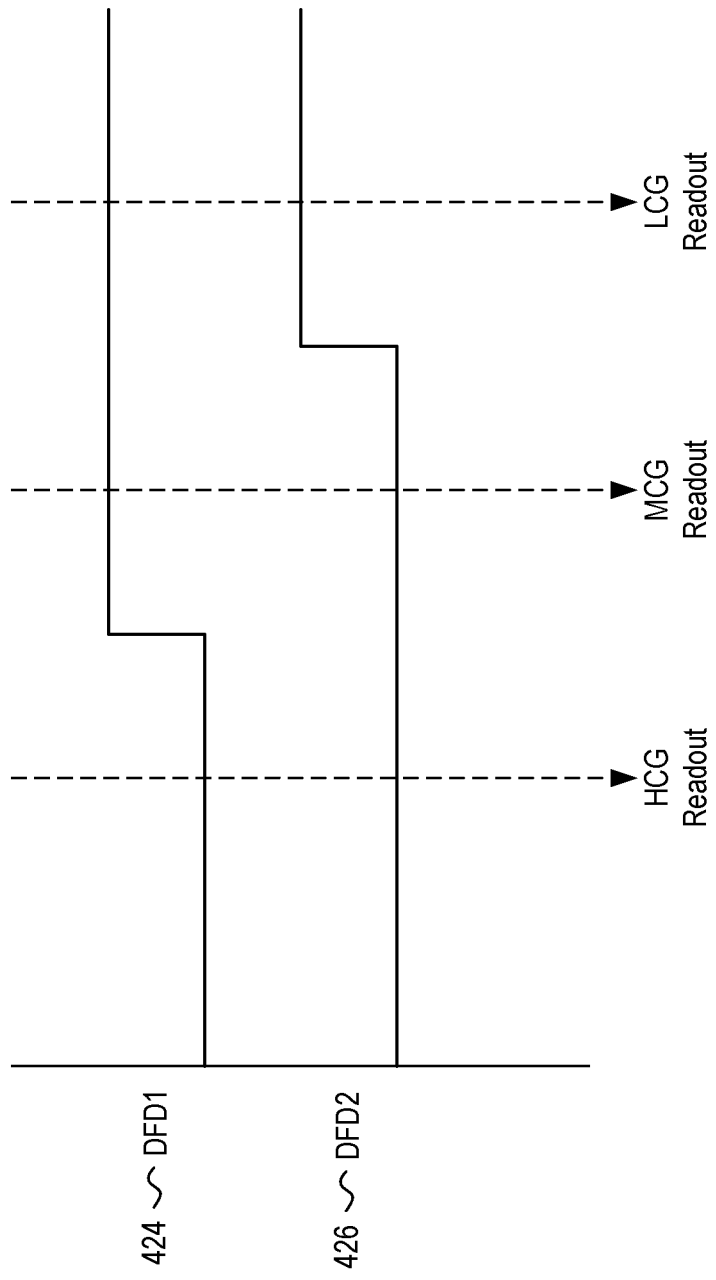
FIG. 4 illustrates a timing diagram of an example pixel cell in accordance with the teachings of the present disclosure.

FIG. 4 illustrates a timing diagram of an example pixel cell providing triple conversion gain (TCG) in accordance with the teachings of the present disclosure. The timing diagram includes a high conversion gain (HCG) readout, a medium conversion gain (MCG) readout, and a low conversion gain (LCG) readout. It is appreciated that the timing diagram of FIG. 4 may be an example timing diagram of each of the pixel circuits 304a, 304b, 304c, 304d as shown in FIG. 3, and that similarly named and numbered elements described above are coupled and function similarly below.

In the illustrated example, a first dual floating diffusion control signal DFD1 424 and a second dual floating diffusion control signal DFD2 426 are both configured to be off at the beginning of the readout period. During the HCG readout, because both the first and second dual floating diffusion transistors are off, image charge photogenerated by a photodiode can only be stored in a first floating diffusion (e.g., FD1 318a illustrated in FIG. 3). By blocking access to other floating diffusions, the HCG readout is configured to keep the readout noise low.

After the HCG readout and before the MCG readout, the first dual floating diffusion control signal DFD1 426 is configured to turn on while the second dual floating diffusion control signal DFD2 426 is configured to remain off. During the MCG readout, because only the first dual floating diffusion transistor is on, image charge photogenerated by the photodiode can be stored in both the first floating diffusion and a second floating diffusion (e.g., FD2 328a).

After the MCG readout and before the LCG readout, the second dual floating diffusion control signal DFD2 426 is configured to turn on while the first dual floating diffusion control signal DFD1 426 is configured to remain on. During the LCG readout, because both the first and second dual floating diffusion transistors are on, image charge photogenerated by the photodiode can be stored in the first floating diffusion, the second floating diffusion, and a third floating diffusion (e.g., FD3 338a). By allowing access to the three floating diffusions, the LCG readout is configured to maximize the utilization of the pixel cell's full well capacity and thereby increase the dynamic range.

The timing diagram illustrated in FIG. 4 provides several advantages. By providing triple conversion gain, the pixel cells have improved dynamic range and allow the imaging system to capture images with varying brightness regions with more detail and image quality. The imaging system also has greater flexibility since it can choose from three different conversion gain modes (as opposed to only one or two). Furthermore, by coupling the floating diffusions of different pixel cells together, the full well capacity of each pixel cell and the conversion gain ratio between the three different conversion gain modes are increased. For example, an imaging system configured in accordance with the teachings of the present disclosure can have a conversion gain ratio between HCG:MCG:LCG of 16:4:1. In various examples, the effective conversion gains of HCG and MCG readouts are half of the aforementioned conversion gains, yielding an effective conversion gain ratio between HCG:MCG:LCG of 8:2:1.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. A pixel array, comprising:
a plurality of pixel cells arranged in rows and columns, wherein each of the pixel cells is configured to generate a respective image signal in response to incident light, wherein each of the pixel cells includes:
a photodiode configured to photogenerate image charge in response to the incident light;
a first floating diffusion (FD) coupled to receive the image charge from the photodiode;
a reset transistor coupled between a voltage source and the first FD;
a second FD coupled between the first FD and ground, wherein the second FD is selectively coupled to the voltage source via the first FD and the reset transistor; and
a first dual floating diffusion transistor coupled between the first and second FDs,
wherein a second FD of a first one of the pixel cells is coupled to a second FD of a second one of the pixel cells, and
wherein a second FD of a third one of the pixel cells is coupled to a second FD of a fourth one of the pixel cells.

2. The pixel array of claim 1, further comprising a second dual floating diffusion transistor coupled to the second FDs of the first, second, third, and fourth ones of the pixel cells.

3. The pixel array of claim 1, wherein each of the pixel cells further includes:
a third FD coupled between the second FD and ground; and
a second dual floating diffusion transistor coupled between the second and third FDs,
wherein a third FD of the first one of the pixel cells is coupled to a third FD of the third one of the pixel cells, and
wherein a third FD of the second one of the pixel cells is coupled to a third FD of the fourth one of the pixel cells.

4. The pixel array of claim 3, wherein the first and second dual floating diffusion transistors of each of the pixel cells are configured to be off during a high conversion gain (HCG) readout, wherein the first dual floating diffusion transistor of each of the pixel cells is configured to be on and the second dual floating diffusion transistor of each of the pixel cells is configured to be off during a medium conversion gain (MCG) readout, and wherein the first and second dual floating diffusion transistors of each of the pixel cells are configured to be on during a low conversion gain (LCG) readout.

5. The pixel array of claim 1, wherein the second FD of the first one of the pixel cells is vertically coupled to the second FD of the second one of the pixel cells, and wherein the second FD of the third one of the pixel cells is vertically coupled to the second FD of the fourth one of the pixel cells.

6. The pixel array of claim 3, wherein the third FD of the first one of the pixel cells is horizontally coupled to the third FD of the third one of the pixel cells, and wherein the third FD of the second one of the pixel cells is horizontally coupled to the third FD of the fourth one of the pixel cells.

7. The pixel array of claim 3, wherein each of the pixel cells further comprises:
a first capacitor coupled between the first FD and ground;
a second capacitor coupled between the second FD and ground; and
a third capacitor coupled between the third FD and ground.

8. The pixel array of claim 7, wherein the second capacitor has the same capacitance as the first capacitor, and wherein the third capacitor has twice the capacitance as the first capacitor.

9. The pixel array of claim 7, wherein the second capacitor has 1.5 times the capacitance as the first capacitor, and wherein the third capacitor has 1.5 times the capacitance as the first capacitor.

10. The pixel array of claim 7, wherein each of the first, second, and third capacitors is a horizontal metal-insulator-metal capacitor.

11. A pixel array, comprising:
a plurality of pixel cells arranged in rows and columns, wherein each of the pixel cells is configured to generate a respective image signal in response to incident light, wherein each of the pixel cells includes:
a photodiode configured to photogenerate image charge in response to the incident light;
a first floating diffusion (FD) coupled to receive the image charge from the photodiode;
a reset transistor coupled between a voltage source and the first FD;
a second FD coupled between the first FD and ground;
a first dual floating diffusion transistor coupled between the first and second FDs, wherein the second FD is selectively coupled to the voltage source via the first dual floating diffusion transistor, the first FD, and the reset transistor;
a third FD coupled between the second FD and ground; and
a second dual floating diffusion transistor coupled between the second and third FDs,
wherein a third FD of a first one of the pixel cells is coupled to a third FD of a second one of the pixel cells.

12. An imaging system, comprising:
a pixel array, including:
a plurality of pixel cells arranged in rows and columns, wherein each of the pixel cells is configured to generate a respective image signal in response to incident light, wherein each of the pixel cells includes:
a plurality of photodiodes configured to photogenerate image charge in response to the incident light;
a first floating diffusion (FD) coupled to receive the image charge from the photodiodes;
a reset transistor coupled between a voltage source and the first FD;
a second FD coupled between the first FD and ground;
a first dual floating diffusion transistor coupled between the first and second FDs;
a third FD coupled between the second FD and ground; and a second dual floating diffusion transistor coupled between the second and third FDs,
wherein a second FD of a first one of the pixel cells is coupled to a second FD of a second one of the pixel cells,
wherein a second FD of a third one of the pixel cells is coupled to a second FD of a fourth one of the pixel cells,
wherein a third FD of the first one of the pixel cells is coupled to a third FD of the third one of the pixel cells, and
wherein a third FD of the second one of the pixel cells is coupled to a third FD of the fourth one of the pixel cells;
a plurality of bitlines coupled to the pixel array;
control circuitry coupled to the pixel array to control operation of the pixel array; and
readout circuitry coupled to the pixel array through the bitlines to readout image data from the pixel array.

13. The imaging system of claim 12, wherein the first and second dual floating diffusion transistors of each of the pixel cells are configured to be off during a high conversion gain (HCG) readout, wherein the first dual floating diffusion transistor of each of the pixel cells is configured to be on and the second dual floating diffusion transistor of each of the pixel cells is configured to be off during a medium conversion gain (MCG) readout, and wherein the first and second dual floating diffusion transistors of each of the pixel cells are configured to be on during a low conversion gain (LCG) readout.

14. The imaging system of claim 12, wherein the second FD of the first one of the pixel cells is vertically coupled to the second FD of the second one of the pixel cells, and wherein the second FD of the third one of the pixel cells is vertically coupled to the second FD of the fourth one of the pixel cells.

15. The imaging system of claim 12, wherein the third FD of the first one of the pixel cells is horizontally coupled to the third FD of the third one of the pixel cells, and wherein the third FD of the second one of the pixel cells is horizontally coupled to the third FD of the fourth one of the pixel cells.

16. The imaging system of claim 12, wherein the first and second ones of the pixel cells are arranged symmetrically with the third and fourth ones of the pixel cells.

17. The imaging system of claim 12, wherein each of the pixel cells further comprises:
   a first capacitor coupled between the first FD and ground;
   a second capacitor coupled between the second FD and ground; and
   a third capacitor coupled between the third FD and ground.

18. The imaging system of claim 17, herein the second capacitor has the same capacitance as the first capacitor, and wherein the third capacitor has twice the capacitance as the first capacitor.

19. The imaging system of claim 17, wherein the second capacitor has 1.5 times the capacitance as the first capacitor, and wherein the third capacitor has 1.5 times the capacitance as the first capacitor.

20. The imaging system of claim 17, wherein each of the first, second, and third capacitors is a horizontal metal-insulator-metal capacitor.

* * * * *